United States Patent
Schade et al.

(10) Patent No.: US 12,424,637 B2
(45) Date of Patent: Sep. 23, 2025

(54) GAS DIFFUSION ELECTRODE AND USE THEREOF

(71) Applicant: FRAUNHOFER-GESELLSCHAFT ZUR FÖRDERUNG DER ANGEWANDTEN FORSCHUNG E.V., Munich (DE)

(72) Inventors: Wolfgang Schade, Goslar (DE); Andreas Gabler, Berlin (DE)

(73) Assignee: Fraunhofer-Gesellschaft zur Förderung der angewandten Forschung e.V, Munich (DE)

( * ) Notice: Subject to any disclaimer, the term of this patent is extended or adjusted under 35 U.S.C. 154(b) by 871 days.

(21) Appl. No.: 17/581,218

(22) Filed: Jan. 21, 2022

(65) Prior Publication Data
US 2022/0149389 A1   May 12, 2022

Related U.S. Application Data

(62) Division of application No. 15/309,149, filed as application No. PCT/EP2015/059937 on May 6, 2015, now abandoned.

(30) Foreign Application Priority Data

May 7, 2014  (DE) ............... 10 2014 208 575.6

(51) Int. Cl.
*H01M 4/94* (2006.01)
*C25B 11/051* (2021.01)
(Continued)

(52) U.S. Cl.
CPC ............. *H01M 4/94* (2013.01); *C25B 11/051* (2021.01); *C25B 11/073* (2021.01); *C25C 7/02* (2013.01);
(Continued)

(58) Field of Classification Search
CPC ............ H01M 4/94; H01M 4/02; H01M 4/04; H01M 4/366; H01M 4/38; H01M 4/42;
(Continued)

(56) References Cited

U.S. PATENT DOCUMENTS 3,350,232 A   10/1967  Ryhiner et al.
3,799,811 A   3/1974   Sampson et al.
(Continued)

FOREIGN PATENT DOCUMENTS

DE   2 343 222      3/1974
DE   29 41 774 A1   4/1981
(Continued)

OTHER PUBLICATIONS

E. Antolini, "Studies of gas diffusion electrodes for polymer electrolyte fuel cells: Effect of polytetrafluoroethylene content on the microstructure of the diffusion layer, Proc. Eur. Con. Adv. Mater. Processes Appl. 5'", vol. 3, pp. 3/503-3 to 3/506 1997 (Year: 1997).*
(Continued)

*Primary Examiner* — Michael Y Sun
(74) *Attorney, Agent, or Firm* — Hussey IP, LLC

(57) ABSTRACT

A gas diffusion electrode may be provided comprising an electron conducting layer with a first side and an opposite second side, wherein the first side is provided with a microstructuring, wherein the gas diffusion electrode additionally has a hydrophobic membrane with a first side and an opposite second side, wherein the second side of the membrane is arranged on the first side of the electron conducting layer. A battery or an accumulator or an electrolyser or a galvanic cell may be provided with a gas diffusion electrode of this type.

12 Claims, 4 Drawing Sheets

(51) Int. Cl.

| | |
|---|---|
| *C25B 11/073* | (2021.01) |
| *C25C 7/02* | (2006.01) |
| *H01M 4/02* | (2006.01) |
| *H01M 4/04* | (2006.01) |
| *H01M 4/36* | (2006.01) |
| *H01M 4/38* | (2006.01) |
| *H01M 4/42* | (2006.01) |
| *H01M 4/70* | (2006.01) |
| *H01M 4/86* | (2006.01) |
| *H01M 4/88* | (2006.01) |
| *H01M 4/90* | (2006.01) |
| *H01M 4/92* | (2006.01) |
| *H01M 4/96* | (2006.01) |
| *H01M 8/0247* | (2016.01) |
| *H01M 8/1004* | (2016.01) |
| *H01M 12/08* | (2006.01) |
| *H01M 8/1039* | (2016.01) |

(52) U.S. Cl.
CPC ............... *H01M 4/02* (2013.01); *H01M 4/04* (2013.01); *H01M 4/366* (2013.01); *H01M 4/38* (2013.01); *H01M 4/42* (2013.01); *H01M 4/70* (2013.01); *H01M 4/8657* (2013.01); *H01M 4/88* (2013.01); *H01M 4/90* (2013.01); *H01M 4/9016* (2013.01); *H01M 4/92* (2013.01); *H01M 4/96* (2013.01); *H01M 8/0247* (2013.01); *H01M 8/1004* (2013.01); *H01M 12/085* (2013.01); *H01M 2004/021* (2013.01); *H01M 4/8605* (2013.01); *H01M 8/1039* (2013.01); *Y02E 60/10* (2013.01)

(58) Field of Classification Search
CPC ........ H01M 4/70; H01M 4/8657; H01M 4/88; H01M 4/90; H01M 4/9016; H01M 4/92; H01M 4/96; H01M 8/0247; H01M 8/1004; H01M 12/085; H01M 4/8605; H01M 8/1039; H01M 2004/021; C25B 11/051; C25B 11/073; C25C 7/02; Y02E 60/10; Y02E 60/50
See application file for complete search history.

(56) References Cited

U.S. PATENT DOCUMENTS

| | | | |
|---|---|---|---|
| 4,336,217 A | 6/1982 | Sauer | |
| 2004/0142101 A1 | 7/2004 | Eshraghi et al. | |
| 2005/0079418 A1* | 4/2005 | Kelley | C23C 14/042 29/623.1 |
| 2006/0039419 A1* | 2/2006 | Deshi | H01S 3/1106 372/9 |
| 2007/0224487 A1 | 9/2007 | Kwak et al. | |
| 2008/0182012 A1 | 7/2008 | Fisher et al. | |
| 2008/0292944 A1 | 11/2008 | Beckmann et al. | |
| 2012/0021303 A1 | 1/2012 | Amendola et al. | |
| 2013/0146471 A1 | 6/2013 | Dubois et al. | |
| 2013/0230790 A1* | 9/2013 | Kim | H01M 8/1053 429/492 |

FOREIGN PATENT DOCUMENTS

| | | |
|---|---|---|
| DE | 197 42 109 A1 | 4/1999 |
| DE | 10 2004 034 885 A1 | 2/2006 |
| DE | 10 2006 050 090 A1 | 5/2007 |
| DE | 10 2011 100 461 A1 | 11/2011 |
| EP | 2 962 903 A1 | 1/2016 |
| JP | 2004-031325 | 1/2004 |
| JP | 2012-246179 | 12/2012 |
| JP | 2012-246518 | 12/2012 |
| JP | 2012246518 A * | 12/2012 |
| WO | WO 2006/008014 A1 | 1/2006 |

OTHER PUBLICATIONS

Chan Lim "Effects of hydrophobic polymer content in GDL on power performance of a PEM fuel cell" Electrochmica Acta 49 (2004) 4149-4156 (Year: 2004).*
Wei Song "Effect of polytetrafluoroethylene distribution in the gas diffusion layer on water flooding in proton exchange membrane fuel cells" Chinese Journal of Catalysis 35 (2014) 468-473 (Year: 2014).*
Baldacchini, T., et al., "Superhydrophobic Surfaces Prepared by Microstructuring of Silicon Using a Femtosecond Laser," dated Apr. 19, 2006, pp. 4917-4919, Langmuir 2006, 22, © 2006 American Chemical Society.
Wu, B., et al., "Superhydrophobic surfaces fabricated by microstructuring of stainless steel using a femtosecond laser," dated Jul. 25, 2009, pp. 61-66, Applied Surface Science 256 (2009), © Elsevier B.V.
Nayak, B., et al., "Self-organized micro/nano structures in metal surfaces by ultrafast laser irradiation," dated Jun. 8, 2010, pp. 940-949, Optics and Lasers in Engineering 48 (2010), © Elsevier Ltd.
Crouch, C.H., et al., "Comparison of structure and properties of femtosecond and nanosecond laser-structured silicon," dated Mar. 15, 2004, pp. 1850-1852, Applied Physics Letters, vol. 84, No. 11, (3) 2004 American Institute of Physics.
Kim, J.H., et al., "Preparation and characterization of C/Ni—PTFE electrode using Ni—PTFE composite plating for alkaline fuel cells," dated Oct. 24, 2010, pp. 1720-1729, International Journal of Hydrogen Energy, vol. 36, No. 2, © 2010 Professor T. Nejat Veziroglu, Published by Elsevier Ltd., all rights reserved. XP028132964.
International Search Report with translation, issued in PCT/EP2015/059937, dated Jul. 20, 2015, pp. 1-6, European Patent Office, Rijswijk, The Netherlands.
Kurzweil, "Brennstoffzellentechnik: Grundlagen, Komponenten, Systeme, Anwendungen", pp. 3, 41, 43, 53, 55, 56, 57, 60, 64-68, 191-192, Springer Vieweg Verlag, Germany, 2003 (German and English Translation).
Heinzel et al., "Brennstoffzellen: Entwicklung, Technologie, Anwendung", pp. 55-59, 64-67, C.F. Müller Verlag, Germany, 2006 (German and English Translation).
Song et al. Chinese Journal of Catalysts vol. 35 2014 pp. 468-473 (pp. 1-5).
JP 2012-246518 Espacenet English Machine translation Abstract printed Jun. 10, 2019.
JP 2012-246518 Espacenet Abstract English Machine translation Abstract printed Jun. 10, 2019.
Lim et al. Electrohcimica Acta vol. 49 2004 4149-4156.
Sedeghifar et al. Journal of Power Sorces 2013 pp. 269-279 on line Jan. 29, 2013.
Gerteisen et al. Journal of Power Sources vol. 177 2008 pp. 348-354 laser holes in GDL.
Encyclopedia of Electrochemical Power Sources [Garche] (Garche, et al.; Elsevier, Amsterdam/Netherlands—209 pp. 808 and 623), 2009.
Antolini et all. "Studies of gas diffusion electrodes for polymer electrolyte fuel cells: effect of polytetrafluoroethylene content on the microstructure of the diffusion layer'"Proc Eur Conf Adv Mater Processess Appl 5 sup vol. 3 pp. 3-503-3-503 1992.pdf.

* cited by examiner

GAS DIFFUSION ELECTRODE AND USE THEREOF

CROSS-REFERENCE TO RELATED APPLICATIONS

This application is a divisional of U.S. non-provisional patent application Ser. No. 15/309,149 filed Nov. 4, 2016, which is a 371 nationalization of PCT/EP2015/059937, entitled "GAS DIFFUSION ELECTRODE AND USE THEREOF," having an international filing date of May 6, 2015, which in turn claims priority under 35 USC § 119 to German patent application 10 2014 208 575.6 filed on May 7, 2014. The entire contents of each of the above-identified applications are hereby incorporated by reference.

TECHNICAL FIELD

The invention relates to a gas diffusion electrode with an electron conducting layer comprising a first side and an opposite second side, with the first side being provided with a micro-structuring. Gas diffusion electrodes of this type can be used in batteries, accumulators, electrolyzers, or fuel cells.

DETAILED DESCRIPTION

Figure 1:
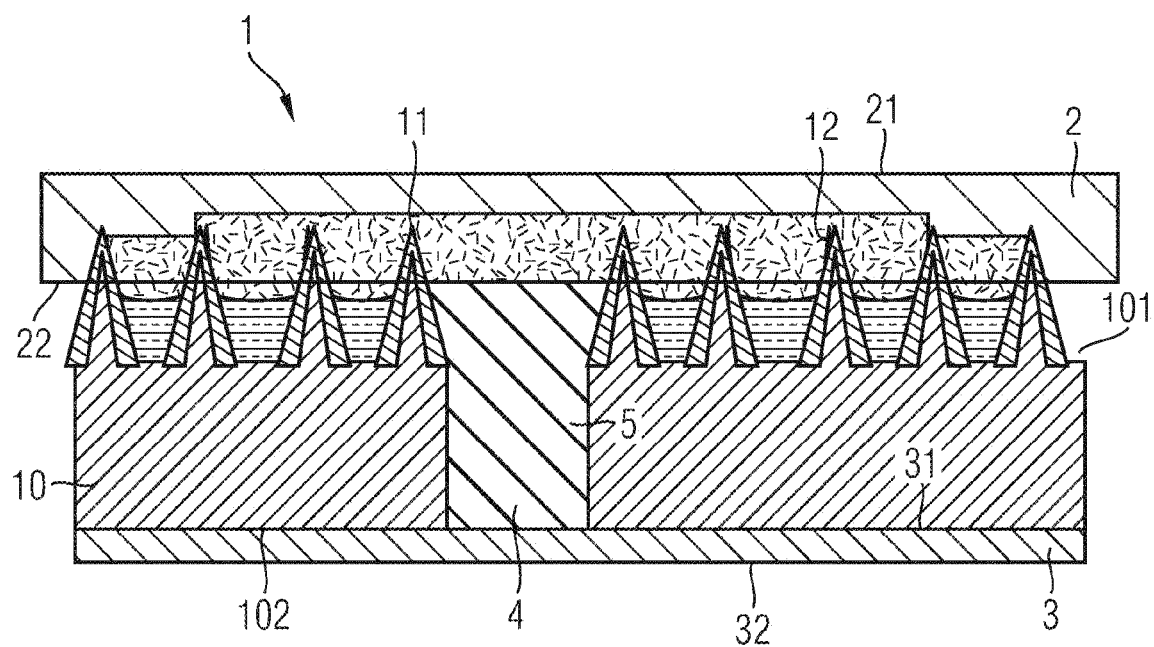
FIG. 1 shows a cross-section through a gas diffusion electrode according to the invention.

A generic gas diffusion electrode is known from DE 10 2011 100 461 A1. This gas diffusion electrode comprises an electron conducting layer made from a metallic material, which is provided at the surface with a hydrophobic structuring. Additionally, gas supply channels are provided in the electron conducting layer, by which gaseous reactants can be supplied to the surface of the electron conducting layer. The surface is furthermore provided with at least one catalyst. When operating the gas diffusion electrode it immerses into the liquid electrolyte such that a three-phase boundary forms at the hydrophobic surface. At said three-phase boundary gaseous reactants, liquid electrolytes, and solid catalyst materials contact each other.

However, this known gas diffusion electrode has the disadvantage that the liquid electrolyte, in spite of the hydrophobic features of the surface structuring, can completely moisten the surface of the electron conducting layer in some operating states so that the formation of a three-phase boundary is prevented.

In view of the prior art, the invention therefore may provide a gas diffusion electrode which has increased reliability and/or a wider range of applications.

The objective is attained according to the invention in a gas diffusion electrode according to claim 1 as well as a battery, an accumulator, an electrolyzer, or a galvanic cell according to claim 10.

According to the invention a gas diffusion electrode is proposed with an electron conducting layer. The electron conducting layer comprises a relatively high conductivity and/or low electric resistance in order to supply an electric current to the reaction zone and/or to dissipate electric current from the reaction zone. Electron transferring, and simultaneously redox, reactions are thereby possible at the gas diffusion electrode.

In some embodiments of the invention, the electron conducting layer may include metal or an alloy or, be made therefrom. This way sufficiently high conductivity may be ensured. In some embodiments of the invention, the electron conducting layer may be coated with a material having high conductivity, for example gold or silver, in order, thereby, to increase the electric conductivity of the electron conducting layer. The layer thickness may in this case range from approximately 20 nm to approximately 100 nm.

In some embodiments of the invention, the electron conducting layer may be made from a material which forms a passivation layer against a corrosive effect of the reaction products and/or reaction educts and/or acidic or alkaline electrolytes. This way the long-term stability of the gas diffusion electrode is improved such that the operating life may be increased.

The electron conducting layer may, in some embodiments of the invention, have a thickness from approximately 10 μm to approximately 150 μm. In other embodiments of the invention, the electron conducting layer may have a thickness from approximately 25 μm to approximately 100 μm. This way, on one hand, a lower material consumption is possible and, on the other hand, sufficient electric conductivity is possible.

The electron conducting layer comprises a first side and an opposite second side. At least the first side is provided with a micro-structuring so that at least the first side of the electron conducting layer features hydrophilic features. The micro-structuring can be generated, in some embodiments of the invention, by way of laser radiation, which impacts the first side of the electron conducting layer during a production step. In particular, here laser radiation with a pulse term of less than one nanosecond or less than 100 femtoseconds can be used. In some embodiments of the invention, the electron conducting layer can be exposed to processing gas, for example nitrogen, during said laser radiation.

In some embodiments of the invention, the micro-structuring may lead to an enlargement of the surface of the first side by a factor from 20 to 60. In some embodiments of the invention, the micro-structuring may lead to an enlargement of the surface of the first side by a factor from 25 to 55. This way the thickness of the three-phase boundary is increased, with simultaneously yielding more compact dimensions for the gas diffusion electrode according to the invention.

In some embodiments of the invention, the micro-structuring is only present at the surface of the first side, with the remaining material of the electron conducting layer not being porous. This way the entire cross-section is still available for conducting electric current.

According to the invention, it is now proposed to bring the hydrophilic first side of the electron conducting layer in contact with a hydrophobic membrane. The hydrophobic membrane also has a first side and an opposite second side, with the second side of the membrane being arranged on the first side of the electron conducting layer. This way it is prevented that the hydrophilic electron conducting layer during operation of the apparatus is completely covered with electrolyte such that at all times a three-phase boundary can form reliably.

In some embodiments of the invention, the hydrophobic membrane may be laminated or rolled onto the first side of the electron conducting layer. In some embodiments of the invention, the electron conducting layer and the membrane may be compressed to each other in a roller press so that a mechanic connection develops between the electron conducting layer and the membrane, with parts of the micro-structuring at least partially penetrating into the membrane. In another embodiment of the invention the membrane may be generated with the use of a doctor, by spraying, spin-coating, or chemical vapor deposition directly on the first side of the electron conducting layer.

In some embodiments of the invention, the membrane may comprise polytetrafluoroethylene or be made therefrom. This material is chemically stable in reference to a plurality of acids, alkaline substances, or gaseous oxidizing substances, so that reliable operation is possible over an extended period of time. On the other hand, the material can be produced and processed in a beneficial fashion, so that the gas diffusion electrode according to the invention is also suitable for mass production. The material is further sufficiently ductile so that a hydrophilic structure can penetrate into the membrane.

In some embodiments of the invention, the membrane may have a thickness from approximately 10 µm to approximately 125 µm. In some embodiments of the invention, the membrane may have a thickness from approximately 25 µm to approximately 100 µm. This allows, on one hand, an effective gas transport so that gaseous educts can be fed to the three-phase boundary of the gas diffusion electrode or gaseous products can be dissipated from the three-phase boundary. Simultaneously the membrane features sufficient mechanic stability in order to allow a reliable operation of the gas diffusion electrode.

In some embodiments of the invention, the membrane is embodied in a gas-permeable fashion. This can be ensured on one hand by pores, which may be inserted for example during the production of the membrane in a sintering process or during the production from a pre-stretched polymer. The pores may have, in some embodiments of the invention, a diameter from 1 µm to approximately 10 µm or a diameter from approximately 2 µm to approximately 6 µm or a diameter from approximately 100 nm to approximately 500 nm.

In some embodiments of the invention, the electron conducting layer may comprise titanium and/or gold and/or silver and/or molybdenum and/or tungsten and/or a stainless steel alloy or be made therefrom. These materials are either resistant against the corrosive attack of acids or alkaline substances or they form a stable oxide or nitrite or oxinitrite layer at the surface so that the stability of the electron conducting layer is protected from attacks by the electrolyte during the life-span of the gas diffusion electrode. Simultaneously, then sufficiently large cross-sectional portions remain in the core of the electron conducting layer with a metallic bonding, which ensures a low electric resistance of the electron conducting layer. Due to the fact that the electron conducting layer is provided with the structuring proposed according to the invention only at its surface and it abstains from having a porous or sintered solid body, no corrosive attack can occur to lower laying sections inside the volume of the electron conducting layer.

In some embodiments, the electron conducting layer comprises nickel, which on one hand ensures sufficiently high electronic conductivity, and on the other hand, has catalytic features so that the electron conducting layer is simultaneously operating as the catalyst for the reactions processing at the gas diffusion electrode.

In some embodiments of the invention, the micro-structuring may have individual structures with an aspect ratio from approximately 1:3 to approximately 3:1. This way sufficient enlargement of the surface is possible and good hydrophilic features.

In some embodiments of the invention, the micro-structuring may include individual structures, or be made therefrom, that have a diameter at a base from approximately 10 µm to approximately 30 µm. The length of these individual structures can also range from approximately 10 µm to approximately 30 µm. The length is here determined between the base and the tip of the individual structures. Here, the area and/or in the cross-section the distance is considered the base in the sense of the present description at which the micro-structuring transfers into the unstructured volume of the electron conducting layer.

In some embodiments of the invention, the electron conducting layer may comprise a plurality of electrolyte channels. The electrolyte channels may extend from the second side to the first side of the electron conducting layer. This way a liquid electrolyte can be supplied from the second side of the electron conducting layer such that it spreads through the electrolyte channel to the first side.

The hydrophobic membrane ensures here that the electrolyte not completely moistens the first side of the electron conducting layer so that even gaseous educts can be introduced, for example oxygen.

In some embodiments of the invention, the electrolyte channels may each have a diameter from approximately 50 µm to approximately 150 µm. In some embodiments of the invention the electrolyte channels may each have a diameter from approximately 300 µm to approximately 1000 µm. In some embodiments of the invention, the electrolyte channels may be inserted in the electron conducting layer by way of machining or by laser processing.

In some embodiments of the invention, at least one catalyst may be applied on the first side of the electron conducting layer. This way catalyst material can be saved by using another, usually more cost-effective or easier available material can be used for the electron conducting. In another embodiment of the invention the catalyst may comprise platinum and/or nickel and/or silver and/or palladium and/or manganese oxide and/or rhodium or be made therefrom. In some embodiments of the invention, the area coating of the catalyst may range from approximately 0.05 mg*cm$^{-2}$ to approximately 0.4 mg*cm$^{-2}$. In other embodiments of the invention, the area coating of the catalyst may range from approximately 0.1 mg*cm$^{-2}$ to approximately 0.35 mg*cm$^{-2}$. In reference to concepts of prior art for gas diffusion electrodes this way expensive and rare catalyst material can be saved, because it is only applied on the surface of the electron conducting layer. Thus catalyst material is only used where the three-phase boundary forms. The mechanic stability of the gas diffusion electrode and the electric conductivity are ensured by more beneficial materials.

In some embodiments of the invention, the catalyst may be applied by way of thermal vapor deposition, sputtering, plasma spraying, or other PVD or CVD-methods known per se on the first side of the electron conducting layer. This allows good control of the precipitated layer thickness and a low consumption of catalyst material.

In some embodiments of the invention, the gas diffusion electrode may further comprise a separator, which is arranged on the second side of the electron conducting layer. The separator may be embodied in an electrically isolating fashion, yet allowing ion conductivity. In some embodiments of the invention, the separator may include at least one polymer or be made from at least one polymer. In some embodiments of the invention, the separator includes at least one isomer, i.e. a thermoplastic synthetic, which can be obtained by way of copolymerization of a non-polar polymer with a polar one. In some embodiments of the invention, the separator may include a sulfonated tetrafluoroethylene. Such a material can be used as an ion exchange membrane or form an ion exchange membrane.

In some embodiments of the invention, the separator may have a thickness from approximately 10 µm to approximately 200 µm. In the first embodiment of the invention the separator may have a thickness from approximately 20 µm to approximately 100 µm. This ensures, on one hand, sufficient electric isolation and simultaneously good permeability for the electrolytes and/or for the components thereof.

The invention is explained in greater detail below with reference to the figures without limiting the general idea of the invention thereto.

Figure 2:
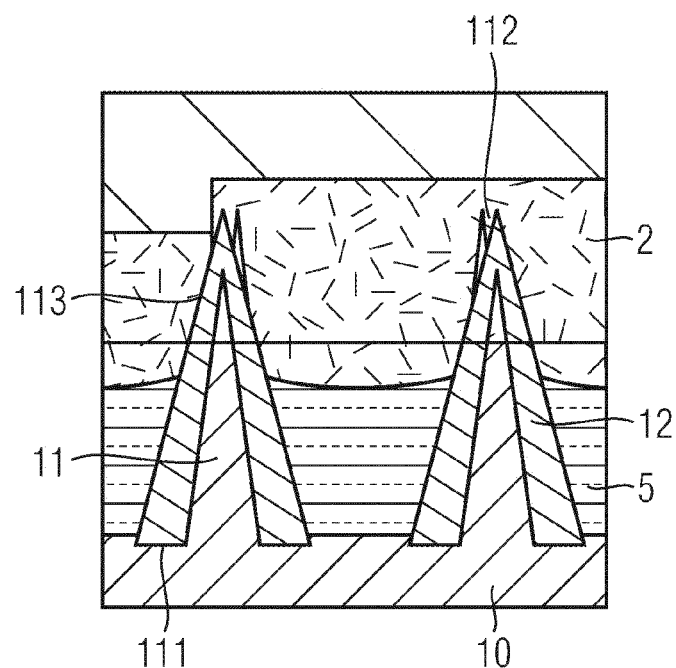
FIG. 2 shows a detail of the gas diffusion electrode shown in FIG. 1.
Figure 3:
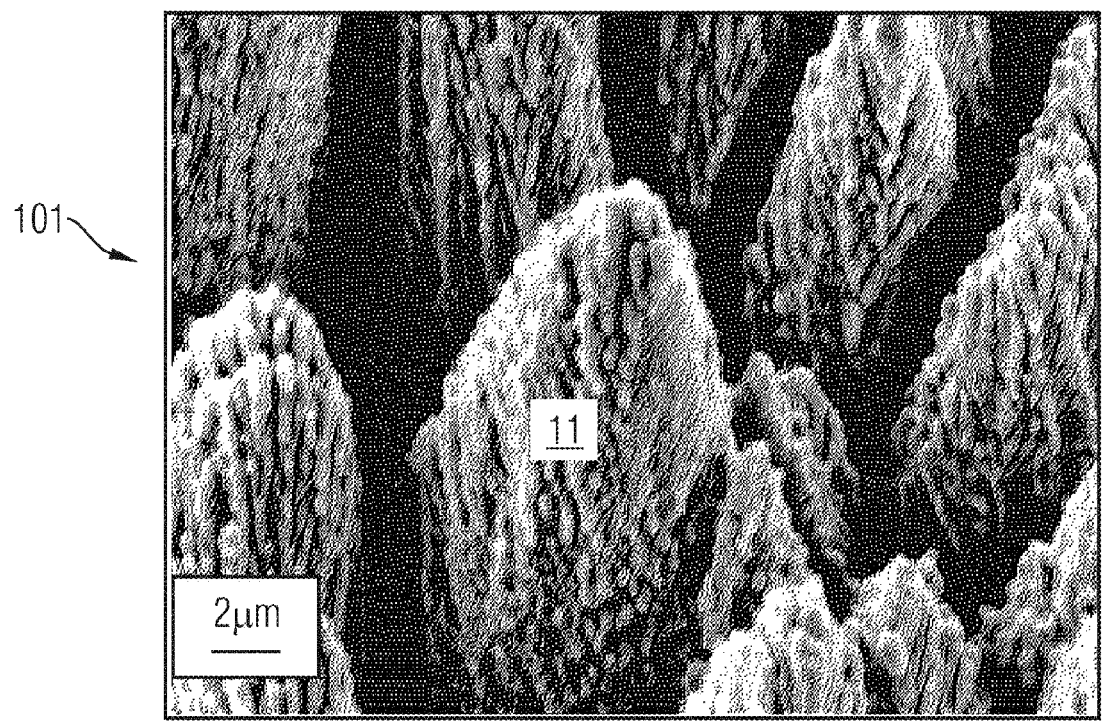
FIG. 3 shows an image taken by a scanning electron microscope of the surface structuring of the electron conducting layer in a first embodiment of the invention.
Figure 4:
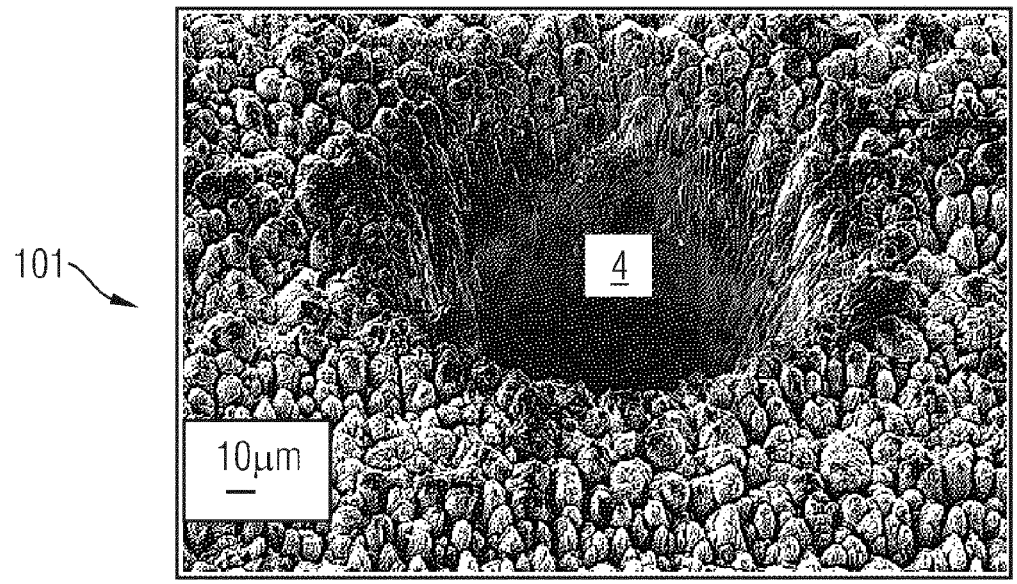
FIG. 4 shows an image taken by a scanning electron microscope with an electrolyte channel.

Based on FIGS. 1 to 4 the gas diffusion electrode according to the invention is explained in greater detail. Here FIGS. 1 and 2 show a cross-section through the gas diffusion electrode. FIGS. 3 and 4 show images of the electron conducting layer taken by an electron microscope.

The gas diffusion electrode 1 comprises an electron conducting layer 10. The electron conducting layer 10 may be made from metal or an alloy in order to allow good electric conductivity, i.e. the embodiment of an electron flux with low Ohmic loss. Simultaneously the electron conducting layer 10 shall offer sufficient resistance to corrosive media, which come in contact with it during operation of the gas diffusion electrode.

In some embodiments the electron conducting layer 10 can therefore comprise or be made from titanium, gold, or a stainless steel alloy, for example.

The electron conducting layer 10 comprises a first side 101 and an opposite second side 102. The first side 101 is provided with a micro-structuring 11. The micro-structuring 11 can be generated for example by laser radiation, particularly by radiation with a quick-pulse laser. The micro-structuring 11 may have a diameter at the base 111 ranging from approximately 10 µm to approximately 30 µm and, at the tip 112, have a diameter from approximately 1 µm to approximately 5 µm. This leads to an approximately conical basic form of the micro-structuring 11. The individual cones may have an aspect ratio from approximately 3:1 to approximately 1:3. The micro-structuring 11 leads to the first side 101 of the electron conducting layer 10 to be hydrophilic, i.e. an aqueous electrolyte 5 adheres to the first side 101 of the electron conducting layer 10.

The first side 101 is furthermore coated with at least one catalyst 12. The catalyst 12 may for example be applied by way of sputtering or other CVD or PVD methods known per se. The thickness and/or area coating may range from approximately 0.05 mg*cm$^{-2}$ to approximately 0.4 mg*cm$^{-2}$. Thus, considerably less catalyst material is required than in other gas diffusion electrodes known per se. The catalyst reduces the activation energy for the reaction occurring at the surface of the gas diffusion electrode.

In order to form a three-phase boundary at the first side 101, this first side 101 is in contact with a hydrophobic membrane 2. The hydrophobic membrane 2 comprises a first side 21 and an opposite second side 22. The second side 22 is in contact with the first side 101 of the electron conducting layer 10, while a section 113 of the micro-structuring 11 penetrating the membrane 2.

The hydrophobic membrane 2 is embodied in a gas-permeable fashion so that at the first side 101 of the electron conducting layer 10 a three-phase boundary can develop between the solid catalyst 12, the liquid electrolyte 5, and a processing gas, which is fed to the first side of the electron conducting layer through the membrane 2.

The remaining electrolyte 5 can be supplied via electrolyte channels 4, which are inserted for example via laser processing into the electron conducting layer 10. The electrolyte channels 4 extend from the second side 102 to the first side 101 of the electron conducting layer 10 such that they can fill the gaps of the micro-structuring 11 with the aqueous electrolyte, starting at the electrolyte channels 4.

On the second side 102 of the electron conducting layer 10, additionally a separator 3 is provided. The separator 3 comprises a first side 31, which is in contact with the second side 102 of the electron conducting layer 10. The opposite side 32 of the separator 3 is in contact with an electrolyte. The separator 3 is embodied in an electrically isolating fashion, so that no electric current flows between the electrolyte and the electron conducting layer 10.

Simultaneously the separator 3 is however ion permeable so that the electrolyte 5 can penetrate the electrolyte channels 4.

FIG. 3 shows once more an image taken by an electron microscope of the first side 101 of the electron conducting layer 10. The micro-structuring 11 in the form of individual, approximately conical columns is clearly discernible. The gaps between adjacent individual structures of the micro-structuring serve at least partially to accept electrolytes, so that here a three-phase boundary can form.

FIG. 4 shows an image taken by an electron microscope of an electrolyte channel 4, which is inserted into the electron conducting layer 10 by way of laser processing.

Figure 5:
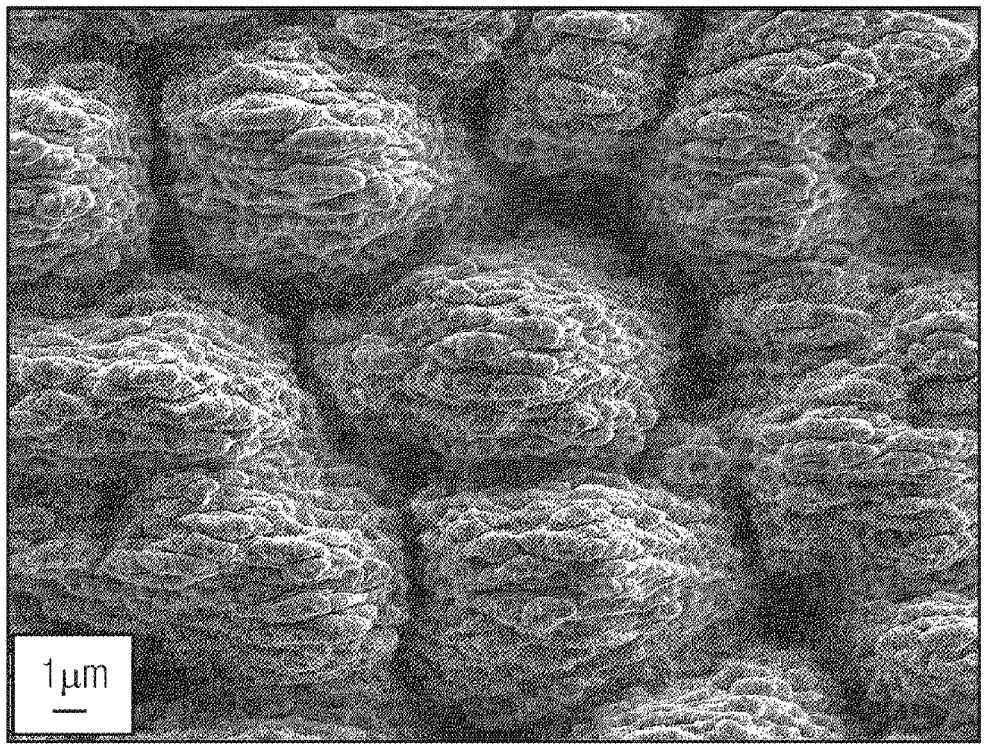
FIG. 5 shows an image taken by a scanning electron microscope of the surface structure of the electron conducting layer in a second embodiment of the invention.

FIG. 5 shows an image of the surface structuring of the electron conducting layer taken by a scanning electron microscope in a second embodiment of the invention. In the second embodiment of the invention the electron conducting layer comprises nickel as an essential component. On one hand, nickel can be used as an electron conducting layer with sufficiently low electric resistance so that during operation of the gas diffusion electrode low Ohmic loss develops. Additionally, nickel is cost-effective and easily available. Due to the fact that nickel additionally is a catalyst that can be used beneficially in alkaline media in some embodiments of the invention, any coating of the electron conducting layer with an additional catalyst material can be forgone.

FIG. 5 shows that the first side of an electron conducting layer, which comprises nickel or is made therefrom, can be provided with the micro-structuring according to the invention.

In a first exemplary embodiment the gas diffusion electrode was made to contact a counter electrode. The counter electrode abuts the second side 32 of the separator 3 and comprises a zinc paste with alkaline electrolytes. The first side 21 of the hydrophobic membrane 2 is in contact with pure oxygen, which is supplied via a gas balloon under atmospheric pressure.

The electron conducting layer of the gas diffusion electrode used comprises titanium, with platinum being used as the catalyst showing an area coating of 0.2 mg*cm$^{-2}$.

Figure 7:
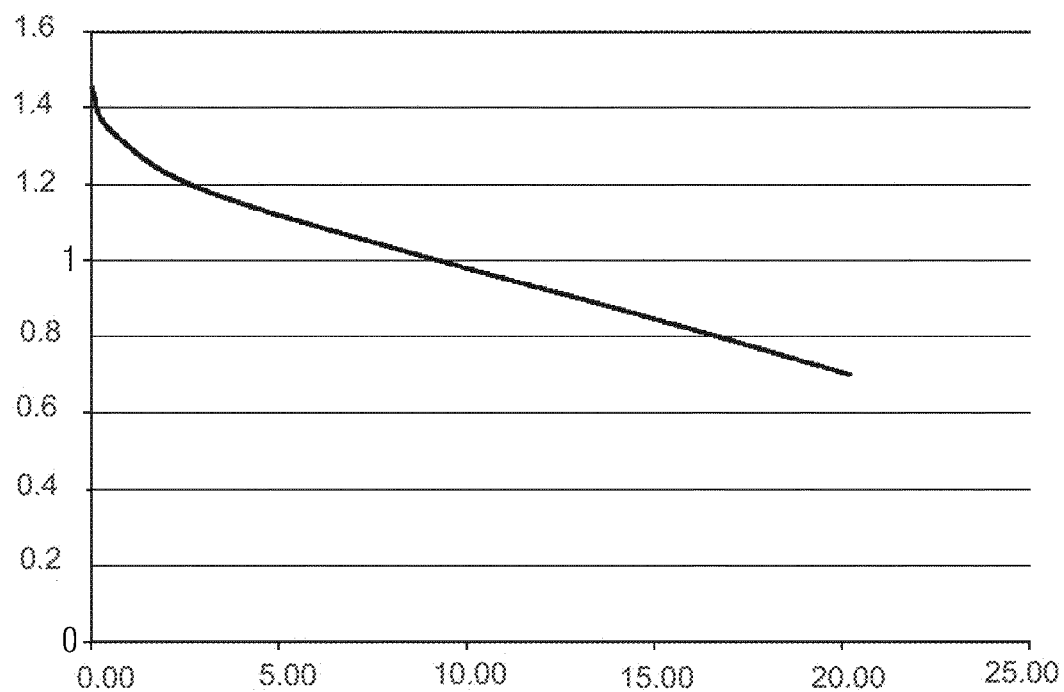
FIG. 7 shows the U-I characteristics of the zinc-oxygen accumulator.

FIG. 7 shows the electric voltage between the electron conducting layer 10 and the counter electrode on the ordinate and the current in mA flowing between the electron conducting layer 10 and the counter electrode on the abscissa. This yields an almost linear connection between current and voltage in the range from approximately 3 mA to 20 mA. The open circuit voltage of the battery formed in this fashion amounts to approximately 1.45 V. FIG. 7 therefore confirms the function of the gas diffusion electrode according to the invention.

Figure 6:
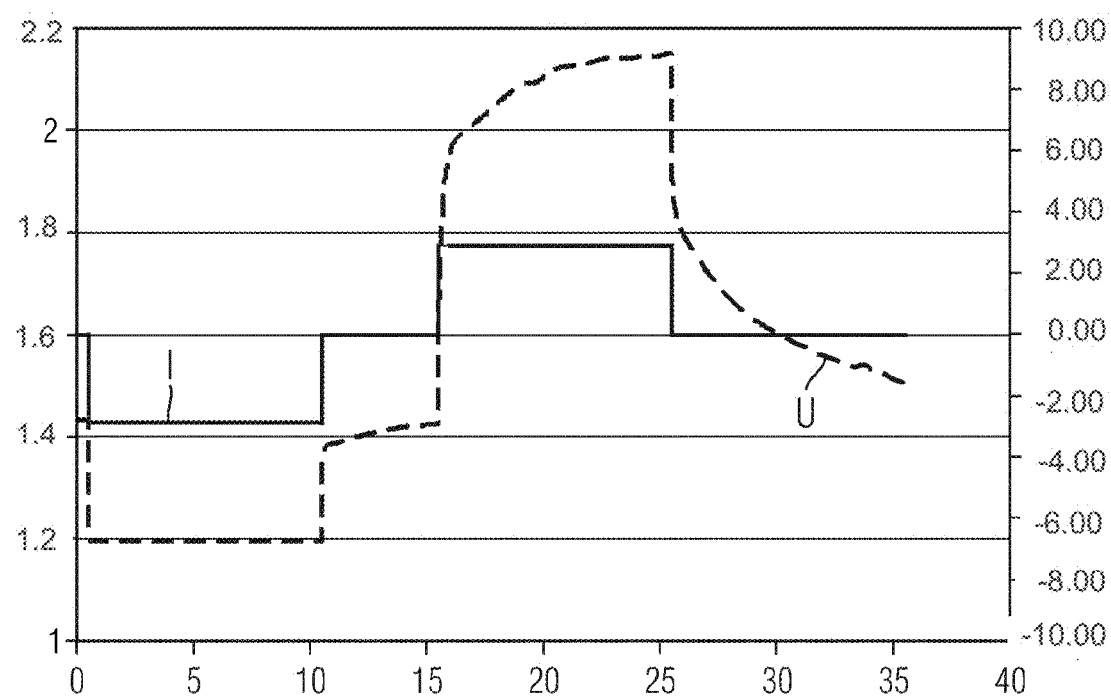
FIG. 6 shows current and voltage progressions during the operation of a zinc-oxygen accumulator equipped with the gas diffusion electrode according to the invention.

FIG. 6 shows the voltage U on the left ordinate and the electric current I on the right ordinate in reference to the measuring term on the abscissa. A discharging and charging cycle is shown of the zinc-oxygen accumulator used in the exemplary embodiment.

At the beginning of the measurement the open circuit voltage of the accumulator amounts to approximately 1.45 V.

Discharging occurs with approximately 3 mA over a period of approximately 10 minutes. Here, a constant voltage develops of 1.2 V. After the end of the discharging process the voltage increases over the next 5 minutes back to the original open circuit voltage.

A charging cycle follows with a constant charging current of approximately 3 mA. Here, a steadily increasing charge voltage develops, which after 10 minutes reaches approximately 2.15 V. After shutting of the charging current the voltage drops in the following 10 minutes back to the open circuit voltage of the zinc-oxygen accumulator. FIG. 6 clearly shows, therefore, that the test cell used in the exemplary embodiment displays the typical behavior expected from an accumulator.

Thus the functionality of the gas diffusion electrode according to the invention has been proven.

Of course, the invention is not limited to the embodiments shown in the figures. The above-stated description is therefore not considered in a limiting fashion, but merely explanatory.

The following claims shall be understood such that a feature mentioned is present in at least one embodiment of the invention. This has no excluding effect for the presence of other features. To the extent the claims and the above-stated description define "first" and "second" features, this terminology serves for differentiating two equivalent features without stipulating any sequence.

The invention claimed is:

1. A method comprising:
    forming a micro-structuring on an electron conducting layer by irradiating the electron conducting layer with laser radiation, the electron conducting layer having a first side and an opposite second side, the micro-structuring formed on the first side of the electron conducting layer, wherein the micro-structuring comprises a plurality of pinecone-shaped projections pointing away from the first side of the electron conducting layer, wherein each of the pinecone-shaped projections has a base diameter, a height, and an aspect ratio of the base diameter to the height within a range from approximately 1:3 to 3:1, wherein the pinecone-shaped projections each has a base with a diameter in a range from approximately 10 μm to approximately 30 μm and a tip having a diameter from approximately 1 μm to approximately 5 μm, and wherein the height of each of the pinecone-shaped projections is the distance between the base and the tip; and
    forming a gas diffusion electrode by bringing the hydrophilic first side of the electron conducting layer and a hydrophobic membrane in contact with each other, the hydrophobic membrane having a first side and an opposite second side, wherein the second side of the membrane is arranged on the first side of the electron conducting layer, wherein the electron conducting layer comprises a plurality of electrolyte channels each of which extends from the first side of the electron conducting layer to the second side of the electron conducting layer.

2. The method of claim 1, wherein the membrane comprises poly-tetrafluoroethylene or is made therefrom, and/or wherein the membrane has a thickness of approximately 10 μm to approximately 100 μm and/or wherein the membrane is gas-permeable.

3. The method of claim 1, wherein the electron conducting layer comprises titanium and/or nickel and/or gold and/or silver and/or molybdenum and/or tungsten and/or a stainless steel alloy or is made therefrom.

4. The method of claim 1, wherein the micro-structuring is partially embedded in the hydrophobic membrane.

5. The method of claim 1, wherein the electrolyte channels each has a diameter from approximately 50 μm to approximately 150 μm.

6. The method of claim 1, further comprising applying at least one catalyst on the first side of the electron conducting layer, which comprises platinum and/or nickel and/or silver and/or palladium and/or at least one manganese oxide and/or rhodium.

7. The method of claim 6, wherein the area coating of the catalyst is within a range from approximately 0.05 mg*cm$^{-2}$ to approximately 0.4 mg*cm$^{-2}$.

8. The method of claim 1, further comprising arranging a separator on the second side of the electron conducting layer.

9. The method of claim 1 further comprising including the gas diffusion electrode in a battery or an accumulator or an electrolyzer or a galvanic cell.

10. The method of claim 1, wherein the area coating of the catalyst is within a range from approximately 0.1 mg*cm$^{-2}$ to approximately 0.35 mg*cm$^{-2}$.

11. The method of claim 1, wherein the laser radiation has a pulse term of less than one nanosecond.

12. The method of claim 1, further comprising exposing the electron conducting layer to a processing gas while irradiating the electron conducting layer with the laser radiation.

\* \* \* \* \*